United States Patent
Byl et al.

(10) Patent No.: US 12,421,122 B2
(45) Date of Patent: Sep. 23, 2025

(54) GAS STORAGE SYSTEMS AND METHOD THEREOF

(71) Applicant: ENTEGRIS, INC., Billerica, MA (US)

(72) Inventors: Oleg Byl, Southbury, CT (US); Diego Troya, Blacksburg, VA (US); Nathan B. Jones, Blacksburg, VA (US); John R. Morris, Blacksburg, VA (US)

(73) Assignee: ENTEGRIS, INC., Billerica, MA (US)

( * ) Notice: Subject to any disclaimer, the term of this patent is extended or adjusted under 35 U.S.C. 154(b) by 875 days.

(21) Appl. No.: 17/550,740

(22) Filed: Dec. 14, 2021

(65) Prior Publication Data

US 2022/0194804 A1 Jun. 23, 2022

Related U.S. Application Data

(60) Provisional application No. 63/130,007, filed on Dec. 23, 2020.

(51) Int. Cl.
| | |
|---|---|
| *C01B 35/02* | (2006.01) |
| *B01D 53/04* | (2006.01) |
| *B01J 20/10* | (2006.01) |
| *B01J 20/34* | (2006.01) |
| *C01B 33/12* | (2006.01) |
| *F17C 11/00* | (2006.01) |

(52) U.S. Cl.
CPC ............. *C01B 35/02* (2013.01); *B01D 53/04* (2013.01); *B01J 20/103* (2013.01); *B01J 20/3433* (2013.01); *B01J 20/3483* (2013.01); *C01B 33/122* (2013.01); *F17C 11/00* (2013.01); *B01D 2253/106* (2013.01); *B01D 2259/40088* (2013.01); *B01D 2259/4525* (2013.01); *F17C 2270/0518* (2013.01)

(58) Field of Classification Search
CPC ....... C01B 35/02; C01B 33/122; B01D 53/04; B01D 2253/106; B01D 2259/40088; B01D 2259/4525; B01J 20/343; B01J 20/3483; F17C 11/00
See application file for complete search history.

(56) References Cited

U.S. PATENT DOCUMENTS

| | | |
|---|---|---|
| 5,409,526 A | 4/1995 | Zheng |
| 5,993,766 A | 11/1999 | Glenn et al. |
| 2004/0089606 A1 | 5/2004 | Kirkland et al. |

(Continued)

FOREIGN PATENT DOCUMENTS

| | | |
|---|---|---|
| EP | 1569738 B1 | 7/2014 |
| TW | 201134506 A | 10/2011 |

(Continued)

OTHER PUBLICATIONS

Watanabe, "Adsorption of diborane and hydrogen selenide on porous alumina and silica", Journal of Materials Science: Materials in Electronics, 9, 1998, 127-132.*

(Continued)

*Primary Examiner* — Michael Forrest
*Assistant Examiner* — Nicole Lee Quist

(57) ABSTRACT

Described are gas storage medium and methods of storing source gases in the gas storage medium, particularly relating to using hydroxylated metal oxides or hydroxylated metalloid oxides as a storage medium for storing diborane.

6 Claims, 3 Drawing Sheets

(56) References Cited

U.S. PATENT DOCUMENTS

2015/0034500 A1    2/2015  Kim

FOREIGN PATENT DOCUMENTS

TW          201517175 A    5/2015
WO          2020055452 A1  3/2020

OTHER PUBLICATIONS

Yu-Chain Peng et al, "Infrared and Ultraviolet Spectra of Diborane(6): B2H6 and B2D6", Journal of Physical Chemistry A, 2016, 120,5562-5572.*
B.A. Morrow et al., "Infrared Spectrum of Diborane Adsorbed on Silica", Langmuir, 1986, 2, 318-319.*
Gillis-D'Hamers, I. et al., "Kinetic Study of the Chemisorption of Diborane on Silica Gel :Application of the Elovich Equation", J. Chem. Soc. Farday Trans., 1992, vol. 88, No. 1, pp. 65-69.

* cited by examiner

GAS STORAGE SYSTEMS AND METHOD THEREOF

CROSS-REFERENCE TO RELATED APPLICATIONS

This application claims priority to U.S. Provisional Patent Application Ser. No. 63/130,007 entitled "Adsorption of Diborane at a Hydroxylated Metal Oxide Surface" filed on Dec. 23, 2020, the entire disclosure of which is incorporated herein by reference.

FIELD

The invention is in a field of gas storage, for example, using adsorption media and methods of adsorbing a chemical material onto an adsorption medium, particularly relating to using hydroxylated metal oxides (including hydroxylated silica) as adsorption media for gas adsorbing.

BACKGROUND

Source gases (or "reagent gases"), such as diborane ($B_2H_6$), disilane ($Si_2H_6$), trisilane ($Si_3H_8$), germane ($GeH_4$), digermane ($Ge_2H_6$), are commonly used in industrial processes, for example in manufacturing semiconductor and microelectronic devices. In one specific example, diborane is used as a raw material in chemical vapor deposition (CVD) processes such as the growth of doped silicon thin layers or conformal boron-nitride coatings. Diborane is also used in ion implantation applications.

Source gases are supplied to a process, as reagent gases, in a useful gaseous form and with a low level of contaminants. Typically, source gases are contained in a storage vessel in a chemical form, from which the source gases can be delivered for use as a raw material in a desired process. One manner of storing source gases is in a pressurized vessel such as a pressurized cylinder. The source gases may be stored in a pure form at a very high concentration, such as a concentration that approaches one-hundred percent, and delivered in that pure form. However, some source gases, such as diborane, are highly unstable at room temperature. For example, pure diborane held under pressure decomposes quickly, within a matter of days or weeks, to a substantially lower concentration. It is highly desirable to identify adsorption media that are effective to adsorb source gases in a reversible (desorbable) manner, for storing diborane in a chemically stable condition.

SUMMARY

To improve stability, source gases can be stored at a diluted concentration (e.g., one or two percent) in a mixture with an inert gas such as gaseous hydrogen ($H_2$) or nitrogen ($N_2$). Storing source gases in a mixture with an inert gas reduces the rate of decomposition of the source gases, which decomposes at a rate that is inverse to the concentration of diborane in the mixture. For example, the decomposition rate of diborane is inversely related to the concentration of diborane in a mixture to the power of 1.5, i.e.: the decomposition rate is inversely proportional to the concentration of diborane. A lower concentration of diborane in a mixture reduces the rate of decomposition of the diborane.

To further improve stability of source gases, the temperature of the mixture can be reduced. However, this can add significant complication and expense to an overall process of preparing, transporting, and using a pressurized storage vessel that contains the source gases. To best improve stability, the source gases and inert gas must be charged into the pressurized cylinder, then transported, stored, and eventually connected to a processing tool, all while refrigerated. The cylinder must be refrigerated during an entire time from manufacture to use, including while the cylinder is connected to a processing tool to supply the source gases to the processing tool.

As an alternate means to store and deliver source gases, certain source gases may be adsorbed onto a solid adsorption medium contained in a storage vessel, optionally under pressure, and selectively desorbed for delivery from the vessel. Desorption and delivery of the source gas from the storage vessel may involve application of a reduced pressure, application of thermal energy, or both.

Demonstrated is a method of storing source gases in gas storage medium, especially for reversible adsorption and desorption of source gases on surfaces of the gas storage medium. Example source gases include but not limited to diborane ($B_2H_6$), disilane ($Si_2H_6$), trisilane ($Si_3H_8$), germane ($GeH_4$), Digermane ($Ge_2H_6$). Example storage medium (alternatively referred to as storage medium) include but not limited to hydroxylated metal oxides, hydroxylated oxides of metalloids, and/or hydroxylated silica. For example, the method includes reversibly adsorbing and desorbing diborane on hydroxylated silica. The diborane can be adsorbed, held (e.g., stored), and desorbed from the hydroxylated silica surface without substantial decomposition of the diborane, and in a manner that may allow the hydroxylated silica to be used as an adsorption medium for storage and selective delivery of diborane.

In one specific example method presented herein, the interfacial chemistry of diborane ($B_2H_6$) with hydroxylated silica was investigated via in situ Fourier-transform infrared spectroscopy and temperature-programmed desorption. During exposure of silica to $B_2H_6$ under ultra-high vacuum (UHV) conditions, a decline in the infrared band intensity assigned to excitation of the interfacial silanol O—H vibration at 3750 $cm^{-1}$ and the associated appearance of a redshifted feature at 3687 $cm^{-1}$ revealed that molecular $B_2H_6$ adsorbs to the surface through hydrogen-bonding interactions with interfacial silanol groups. The IR spectrum for silica was completely recovered following desorption of the adsorbates, indicating that interactions between $B_2H_6$ and silica are reversible. Without wishing to be bound by theory, a hypothesis is that the absence of water at the silica surfaces under UHV conditions precludes irreversible reactions of $B_2H_6$ with silica. During thermally programmed desorption (TPD) of diborane from silica, $B_2H_6$ was observed to desorb between 80 and 150 K, evidence for the weak interactions between $B_2H_6$ and the surface. Electronic-structure calculations revealed that these interactions were due to a bifurcated di-hydrogen bond between the terminal B—H groups of the adsorbate and interfacial silanol groups.

In one aspect, the invention relates to a composition that contains gas storage medium, such as hydroxylated metal oxide, hydroxylated oxides of metalloids, and/or hydroxylated silica, where source gases are reversibly stored (e.g., adsorbed) at surfaces of the gas storage medium.

In another aspect, the invention relates to a method of reversibly storing (e.g., adsorbing) source gases (e.g., diborane) onto surfaces of the gas storage medium. The method includes cleaning the gas storage medium (e.g., surfaces of the gas storage medium), exposing the gas storage medium to the source gases, desorbing the source gases from the gas storage medium.

DETAILED DESCRIPTION

Figure 1:
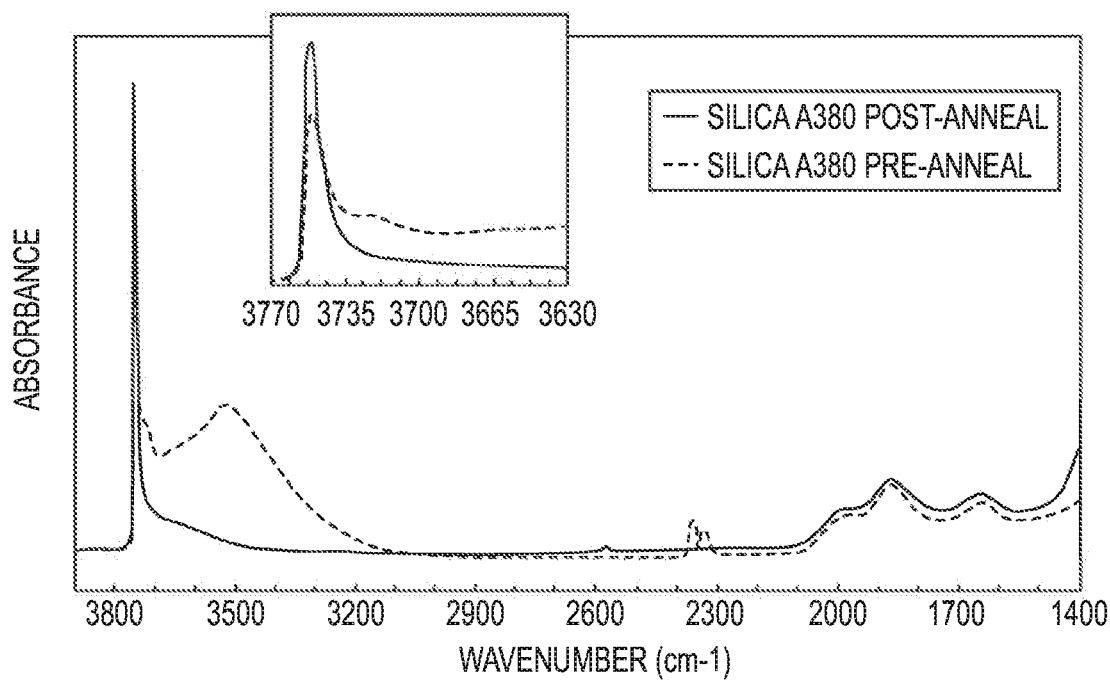
FIG. 1 shows spectra generated from a storage media processed according to a method of the present description.

The following description relates to methods of storing source gases on/in gas storage medium, for example, storing (e.g., adsorbing) diborane on hydroxylated surfaces of the gas storage medium, such as surfaces of hydroxylated metal oxides and/or hydroxylated oxides of metalloids (e.g., hydroxylated silica). In some embodiments, the hydroxylated surfaces are used as an adsorptive storage medium to reversibly adsorb the source gases.

In such adsorptive medium, sources gases can be brought to contact with the hydroxylated surface (prepared as described herein) to allow the source gases to be adsorbed in a useful amount at the surface. In some embodiments, the source gases are adsorbed over 5%-10% of the hydroxylated surface. In some embodiments, the source gases are adsorbed over 10%-20% of the hydroxylated surface. In some embodiments, the source gases are adsorbed over 20-50% of the hydroxylated surface. In some embodiments, the source gases are adsorbed over 90% of the hydroxylated surface. The percentages of the hydroxylated surfaces that adsorbing the source gases are decided by the conditions of the hydroxylated surfaces, such as the hydroxyl groups of the surfaces as explained in detail below.

The source gases can be stored (e.g., adsorbed) for a period of time, and the storage (e.g., adsorbed) condition of the diborane is reversible, meaning that the diborane can remain stored (e.g., adsorbed) on the surface for a period of time. The period of time may be over 6 months, over 1 year, or over 2 years in the present embodiments. The diborane does not experience any significant amount of decomposition while adsorbed on the hydroxylated surface. In one example, 90% of the stored source gases remains intact for over 2 years of storage.

The source gases are released (e.g., desorbed) and delivered for use as a raw material for an industrial process, for example for use as in semiconductor or microelectronic device manufacturing. In some embodiment, the released source gases are in pure form. In other words, the released source gases are free of inert gases for storage purposes (e.g., hydrogen and/or nitrogen) or decomposition gases generated from storage. For example, the released source gas is pure, or substantially pure diborane without hydrogen, nitrogen, tetra-borane ($B_4H_9$) and/or penta-borane ($B_5H_7$).

As used herein, diborane is a chemical compound having the chemical formula $B_2H_6$. For example, a chemical compound consists of two boron atoms and six hydrogen atoms.

Gas storage medium, such as metal oxide and/or metal metalloid (e.g., silica) materials can be formed and processed to contain hydroxyl groups at surfaces of the materials. Examples of such materials are hydroxylated silica, hydroxylated titania oxides, hydroxylated zirconia oxides, hydroxylated ceria oxides, hydroxylated hafnia oxides, hydroxylated iron oxides, or other metal oxides or transition metal oxides.

As used herein, the term "hydroxylated metal oxides," and/or "hydroxylated metalloid", refer to metal oxide materials and/or metal metalloid materials in the form of particles that contain hydroxyl groups (—OH groups) attached to the surfaces of these particles. The atoms at the surface of the metal oxides and/or metal metalloid oxides are referred to as surface atoms. For example, the term "hydroxylated silica" refers to the silica particles having hydroxyl in the format of —SiOH groups located at surface silicon atoms. Hydroxylated silica is different from dehydroxylated silica, which is a silica material that has been thermally or chemically treated to remove a large amount of hydroxyl groups from the silica surfaces to produce silica surfaces that contain very low levels or essentially no surface hydroxyl groups.

Hydroxylated metal oxides, hydroxylated metalloid (e.g., silica) oxides are understood to have surfaces that are covered to varying degrees by hydroxyl groups. The amount and placement of the hydroxyl groups at a surface can affect surface properties, including the ability of the surface to adsorb other chemical species (e.g., diborane). As described herein as an example, silica may be processed in a manner in which hydroxyl groups become distributed over the silica surfaces. In some embodiments, over 30% of the silica surfaces are hydroxylated. In some embodiments, over 50% of the silica surfaces are hydroxylated. In some embodiments, over 90% of the silica surfaces are hydroxylated. The percentages of the hydroxylated surfaces are decided by the surface treatment (such as drying and/or cleaning as explained in detail below) prior to the storing (absorbing) of the source gases. The hydroxyl groups serve as docking sites for diborane adsorption.

Additionally, atmospheric water vapor can become adsorbed at surfaces of metal oxides and/or metal metalloid oxides, for example, silica. By one possible mechanism, water may become adsorbed at a hydroxylated surface through hydrogen bonds formed between water and the hydroxyl groups. According to methods of the present description, a metal oxide or metalloid oxide (e.g., silica) surface is preferably treated to remove adsorbed water from the surface of the metal oxide, to facilitate adsorption of diborane at the surface and to increase stability of diborane adsorbed at a metal oxide surface. Water adsorbed at surfaces of hydroxylated silica may be detected by FTIR techniques, as a spectral feature centered at a wave number of about 3500 $cm^{-1}$.

Metal oxide and/or metal metalloid oxide, particularly silica, may also contain geminal hydroxyl groups at the hydroxylated surfaces. The term "geminal hydroxyl groups" refers to two hydroxyl groups both attached at a single surface atom: i.e., $Si(OH)_2$. Steps described herein of treating a metal oxide and/or metal metalloid oxide surfaces to remove adsorbed water from the surface also have the effect of removing (reducing the concentration of or substantially eliminating the presence of) germinal hydroxyl groups, from these surfaces. Thereby leaving the hydroxylated surfaces of the metal oxide and/or metal metalloid oxide with substantially isolated hydroxyl groups. The term "isolated hydroxyl groups" refers to one hydroxyl group attached to a single surface atom: i.e., SiOH.

To prepare a metal oxide and/or metal metalloid oxide, such as silica, for use as an adsorbent for diborane, the surfaces of the metal oxide and/or metal metalloid oxide may be subjected to a process referred to as "cleaning." A cleaning step may be useful to remove adsorbed water from metal oxide and/or metal metalloid oxide surfaces, to reduce the amount or concentration of geminal hydroxyl groups at the surfaces, and to remove other potential contaminants such as undesired hydrocarbons from the surfaces. The result of the surface "cleaning step" is surfaces that has a very low amount of adsorbed water, a reduced amount of geminal hydroxyl groups, and is free of other contaminants. Some surface atoms (e.g., surface silica atoms) may have more than one isolated hydroxyl group attached thereto. In the present embodiments, one surface atom has only one isolated hydroxyl group attaches thereto. Similarly, more than one atoms of the source gases (e.g., dibrane) may be attached to one isolated hydroxyl group. In the present embodiment, only one atom of the source gases is attached to each isolated hydroxyl group.

In some embodiments, the treated surfaces include less than 2% (weight of water/weight of silica) of water. In some embodiments, the treated surfaces include less than 1% (weight of water/weight of silica) of water. In some embodiments, the treated surfaces are free of or substantially free of water. In some embodiments, the treatment decreases the geminal hydroxyl groups. In some embodiments, the surface includes less than 10% of geminal hydroxyl groups (geminal hydroxyl groups/all hydroxyl groups). In some embodiments, the surface includes less than 20% of geminal hydroxyl groups. In some embodiments, the surface includes less than 50% of geminal hydroxyl groups. The percentages of water and the geminal hydroxyl groups are determined by the cleaning process and in turn determine the storge (e.g., adsorbing) of the source gases.

An example "cleaning" method is a "low pressure treatment" that includes exposing the metal oxide (e.g., silica) to a combination of elevated temperature and low pressure in a manner and for an amount of time effective to remove adsorbed water from the surface, to remove other potential contaminants such as undesired hydrocarbons from the surface, to remove or reduce the amount of geminal hydroxyl groups at the surface, but while still leaving an amount of hydroxyl groups at the surface. The temperature of the cleaning step is maintained below a temperature that would cause all hydroxyl groups to be removed from the surface. The cleaning processes or combinations of the cleaning processes described below are designed to obtain surfaces with low percentages of geminal hydroxyl groups while maintain high percentages of the surfaces hydroxylated.

The particular steps taken to remove water from surfaces of a metal oxide includes heat, pressure, and exposure to a flow of gas to carry water away from the surface, and/or combinations thereof. Thus, another example "cleaning" method can include a process of an exposing metal oxide (e.g., silica) surface to an elevated temperature under continuous flow of a dry, clean purge gas such as helium, argon, nitrogen, or other gas capable of carrying away contaminants, e.g., at atmospheric pressure.

Yet another exemplary "cleaning" method may include a combination of steps that include exposing a metal oxide (e.g., silica) surface to an elevated temperature and a low pressure, followed by exposing the surface to a desiccant such as a pressurize dry, clean inert gas, at a suitable pressure, such as ambient pressure (14.7 psia) or higher pressures (30 psia, or 50 psia, or 100 psia, or higher).

The "cleaning" step can be performed on the metal oxide (e.g., silica) prior to placing the metal oxides or metalloid oxides into a storage vessel (e.g., a cylinder) adapted to store the metal oxide or after placing it and sealing for use in gas storage. In the present embodiments, the cleaning step is performed after the metal oxides or metalloid oxides into a storage vessel to simplify operating processes.

An example method of adsorbing diborane on a hydroxylated silica surface that also contains a low amount of water, is described herein. The method, however, is not believed to be limited to the use of hydroxylated silica as an adsorbent for diborane. Instead, other hydroxylated surfaces, e.g., surfaces of other (non-silica) hydroxylated metal oxides and/or hydroxylated metalloid oxides, are believed and expected to be potentially effective as hydroxylated surfaces that are capable of being treated as described herein and used to reversibly adsorb gaseous diborane, preferably with good chemical stability of the adsorbed diborane due to an absence of water at the adsorbing surfaces.

In particular, other hydroxylated surfaces such as metal oxide surfaces and/or metalloid oxide surface can contain, or be treated to contain, a hydroxylated, low water-containing surface that would be effective to allow the surface to act to reversibly adsorb diborane in a chemically stable condition. As a particular example, alumina can be treated by above mentioned cleaning processes or combinations of processes (e.g., low pressure and elevated temperature) to remove adsorbed water while still maintaining an amount of hydroxyl groups at the surface. Similar to hydroxylated silica, a surface of hydroxylated alumina that is processed to contain essentially no physiosorbed water (e.g., less than 2%), while retaining a useful amount of surface hydroxyl groups, may also be effective for adsorbing source gases and selectively releasing (desorbing) the adsorbed source gases. In one example, the weight of the physiosorbed water is less than 1%, less than 0.1%, less than 0.001%, or less than 0.00000001% of the weight of the adsorbent in the present embodiments. In another example, over 30%, 50%, 70%, or 90% of the metal oxides surfaces and/or metalloid oxide surfaces are covered by the hydroxyl groups. In a further example, the hydroxyl groups are isolated hydroxyl groups.

A cleaning step used to prepare a metal oxide surface or a metalloid oxide surface for use as a storage media (e.g., adsorbent for diborane) includes exposing the surface to one or more of low pressure, high temperature, and optional desiccant (such as a flow of clean dry inert gas), in a manner effective to remove water from the surface while retaining an amount of hydroxyl groups. An effective cleaning step may remove physisorbed water, geminal hydroxyl groups, and other chemical species such as hydrocarbons that may also be adsorbed at surfaces of the metal oxide.

A cleaning step may optionally include exposing metal oxide surfaces to low pressure, such as a step that exposes a metal oxide surface to a pressure that is less than 1 Torr, less than $1\times10^{-3}$ Torr, less than $1\times10^{-5}$, or less than $1\times10^{-8}$ Torr.

Along with low pressure, a cleaning step may expose the metal oxide surface to elevated temperature, such as a temperature of at least 300, 400, 500, or 900 Kelvin. The temperature is sufficiently low to prevent complete removal of hydroxyl groups from a treated surface, i.e., to retain an amount of hydroxyl groups at the treated surface.

A cleaning step may include exposing a metal oxide surface dry, clean purge gas, such as by providing a flow of dry, clean purge gas over the surface in an amount and for a time sufficient to assist in removing water from the surface. A dry, clean purge gas can be at least 99.99%, 99.999%, 99.9999%, or 99.99999% pure, with a water content that is below 100 ppm, 10 ppm, 1 ppm, 0.1 ppm, 0.01 ppm, or 0.001 ppm.

In some embodiments, the cleaning step applies low pressure, high temperature, and desiccant simultaneously to the metal oxides and/or metal metalloid oxides to obtain required hydroxylated surfaces. In other embodiments, the cleaning step may apply one or more of low pressure, high temperature, and desiccant in a certain order to obtain required hydroxylated surfaces. In one such example, the cleaning step includes applying high temperature to the metal oxides and/or metal metalloid oxides first. The cleaning step subsequently applies desiccants to further remove water, geminal hydroxyl groups, and or other undesirable materials from the surfaces. Thereafter, the cleaning step applies low pressure to further remove water or geminal hydroxyl groups and any residues of desiccants. The specific order of operations in cleaning step helps removing geminal hydroxyl groups while maintaining isolated hydroxyl groups. The order of operation also helps reduce cost.

The effectiveness of high temperature and low pressure treatment in removing physisorbed water from hydroxylated silica can be identified by FTIR, by observing and comparing FTIR spectral data measured from the treated surface both before and after the treatment. Measuring absorbance of IR spectra before and after a cleaning step can identify a reduction in absorbance at a wave number that corresponds to water adsorbed at the treated surface. Physisorbed water that is present at surfaces of a sample of hydroxylated silica can be identified by FTIR spectra at a wave number centered at 3500 cm$^{-1}$. Methods as described of treating a metal oxide surface to remove water can be effective to reduce an amount of water at the surface to a level that is below a limit of analytical detection, which is believed to be an amount of water at the surface that forms one-percent of a monolayer of water at the surface.

FIG. 1 shows FTIR absorbance spectra of a silica sample measured before and after a low-temperature processing step. The spectra of Silica (Aerosil A380) was measured before and after annealing at 500° C. under UHV for 6 hours, and 750° C. under UHV for 1 hour. Disappearance of shoulder at 3722 cm$^{-1}$ indicates the removal of geminal hydroxyl groups (Si(—OH)$_2$). Depletion of the broad feature centered at 3500 cm$^{-1}$ indicates the removal of hydrogen-bound water molecules, resulting in a commensurate increase in free —OH intensity at 3752 cm$^{-1}$. Features between 2300 and 2400 cm$^{-1}$ represent CO$_2$ outside of the vacuum chamber and can be disregarded.

Removing adsorbed water from a hydroxylated surface before adsorbing diborane onto the hydroxylated surface is believed to improve performance of the hydroxylated surface as an adsorption medium for diborane. Removing water enhances the adsorption capacity of the hydroxylated surface. Alternately or in addition, removing water from the hydroxylated surface increases the chemical stability of diborane that is adsorbed on the hydroxylated surface, i.e., reduce chemical instability of the diborane by reducing the potential for water-initiated decomposition of the diborane adsorbed at surfaces of the hydroxylated surface.

After treating the hydroxylated surface to remove water, the hydroxylated surface is expose to source gases (e.g., diborane), to allow the source gases (e.g., diborane) to adsorb at the treated hydroxylated surfaces. A step of contacting the hydroxylated surface with diborane to allow adsorption of the source gases (e.g., diborane) on the hydroxylated surface may be performed at any effective conditions, such as at a low temperature and a low pressure. The temperature of the hydroxylated surface during an adsorption step may be very low, such as below standard room temperature (293 K), or below 200 K, below 150 K, or below 100 K.

To perform an adsorption step, the source gases (e.g., diborane) may be introduced to the treated ("cleaned") storage medium (e.g., adsorbents) while the adsorbent is contained in the same storage vessel as was used for the "cleaning" step. Alternatively, the source gases can be introduced to the storage medium outside the storage vessel.

Figure 2:
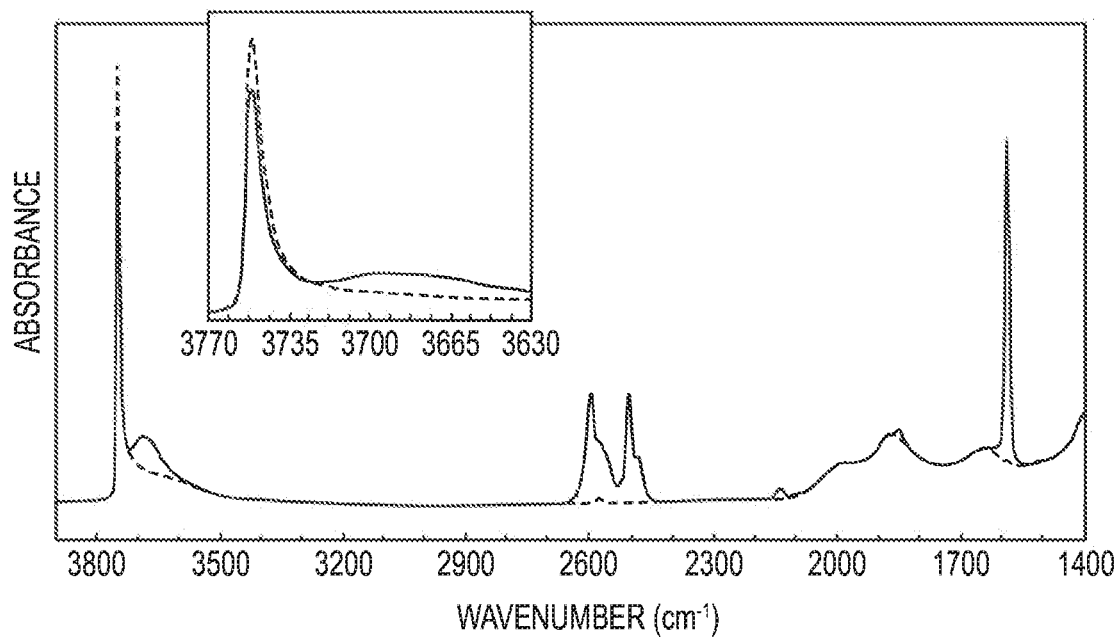
FIG. 2 shows spectra generated from a storage media processed according to a method of the present description.

Diborane adsorbed on a hydroxylated silica surface through hydrogen bonding can be identified by FTIR, which shows evidence for a weak hydrogen-bonding (H-bonding) interaction between B$_2$H$_6$ and Si—OH. The evidence appears as a decrease in the infrared absorbance associated with the free SiO—H band at 3750 cm$^{-1}$, and the appearance of a broad band assigned to H-bonded silanol groups at 3687 cm$^{-1}$. See FIG. 2 and the related discussion below.

According to methods as described, diborane can be presented to a hydroxylated surface in the form of molecular diborane (B$_2$H$_6$), and the molecular diborane is believed to be adsorbed at the hydroxylated surfaces in this same molecular diborane state, i.e., the diborane is not dissociated to borane, BH$_3$, and/or species that adsorb to the hydroxylated surface. In other words, the hydroxylated surfaces are free from borane, BH$_3$, and/or species that adsorb to the hydroxylated surface. When the diborane is desorbed, the diborane is released from the hydroxylated surface in the same molecular diborane (B$_2$H$_6$) form. The adsorbed diborane can be held at the solid adsorbent surface in the adsorbed molecular state and is believed to be relatively stable due to the absence of water at the surface, which may cause increased chemical instability of adsorbed diborane. In some embodiments, a portion or all of the diborane adsorbed may be chemically bonded to the hydroxyl groups. In the present embodiments, the diborane atoms are adsorbed physically to the hydroxyl groups. For example, by Van der Waals force. The adsorbing of the diborane on the surface of the adsorbent lowers the energy of system thermodynamically, comparing to the energy of diborane and the adsorbent before adsorbing.

Source gases (e.g., diborane) may be selectively, controllably desorbed from the hydroxylated surface by increasing the temperature of the storage medium (or adsorbents) and adsorbed source gases. In the example of diborane adsorbed onto a hydroxylated surface within a vacuum chamber, following a "cleaning" step, temperature of the vessel contents may be increased from a temperature used in an adsorption step to a higher temperature, to cause desorption of the adsorbed diborane.

The source gases may be added (e.g., absorbed) to the adsorbent material in an amount that is useful for storing for later, selective desorption of the diborane for delivery to a commercial process. The adsorbent and adsorbed source gases may be contained in the storage vessel at any useful pressure, such as a pressure that is in a low vacuum range, as used during a low pressure treatment step. The pressure may, instead, be a higher pressure, potentially as high as one atmosphere, i.e. 14.7 pounds per square inch (absolute) (psia), or greater, for example 30 psia, or 50 psia, or 100 psia, or 200 psia, or 500 psia, or 1000 psia. The temperature of the adsorbent and adsorbed source gases may be sufficient to maintain an at least partially adsorbed state on the adsorbent, and may be as high as 25° C., 30° C., 45° C., 55° C., or 65° C.

Example

Diborane and silica are used as a non-limiting example to for illustration purposes only. Embodiments discussioned below with respect to diborane and silica equally apply to other similar gas storage medium and source gas systems.

Diborane ($B_2H_6$) is commonly used as a source gas in chemical vapor deposition (CVD) processes such as the growth of doped silicon thin layers or conformal boron-nitride coatings. Even the smallest trace impurities in the source gas can compromise a CVD-created coating. Consequently, understanding the complex decomposition chemistry of $B_2H_6$ is of high importance to the semiconductor fabrication industry.

At room-temperature, $B_2H_6$ slowly self-reacts to form larger boranes such as tetra-borane ($B_4H_9$) and penta-borane ($B_5H_7$). The formation of higher-order boranes in pure diborane gas being very difficult to avoid, there is a critical need for advanced stabilization media for $B_2H_6$ storage, as well as separation media for $B_2H_6$ purification. The development of advanced materials for storage and purification requires a fundamental understanding of the gas-surface chemistry of $B_2H_6$ and other borane species. While there exists an abundance of studies on the solution- and gas-phase reactions of diborane, little is known about the fundamental interactions of $B_2H_6$ at surfaces.

The present experiment was designed to uncover the fundamental nature of $B_2H_6$ uptake, binding, and energetics when the gas-phase species impacts a clean surface of amorphous SiO2 (also referred to as silica). The studies were conducted under ultra-high vacuum (UHV) conditions, where the gas-surface chemistry was isolated from gas-phase processes, the surface remained clean through the experiment, and surface-sensitive analytical methods, in particular infrared spectroscopy and temperature-programmed desorption (TPD), were used to investigate the interfacial processes. The experiments were augmented by DFT calculations to provide molecular-level insight into adsorbate binding motifs. Details of the DFT calculations are described in [J Phys Chem Lett. 2021 May 27; 12(20): 4987-4992], the entirety of which is incorporated herein by reference.

All experiments were conducted in a custom UHV instrument which has been described in detail in [C. H. Sharp et al., J. Phys. Chem. C 121, 8902-8906 (2017)], the entirety of which is incorporated herein by reference. Sample surfaces are mounted on a manipulator in the center of the main vacuum chamber for positioning and temperature control. Power leads connected to an external power supply in conjunction with a liquid-nitrogen reservoir in contact with the sample holder allow for fine control over the sample temperature between 78 and 1000 K. To mitigate the significant hazard presented by $B_2H_6$, a custom gas handling system was developed to deliver diborane to the chamber via a capillary doser array, the outlet of which is positioned within 1 cm of the sample. A residual gas analyzer (RGA) is used to monitor the partial pressures of gases in the chamber. Fourier-transform infrared (FTIR) spectra of the sample spot were recorded with a Bruker Optics Vertex 80V spectrophotometer through external beam ports that allow the IR beam to pass completely through the sample to be detected by an external liquid-nitrogen-cooled MCT-A detector. Each infrared spectrum was recorded as the average of 100 scans with a resolution of 2 $cm^{-1}$. Unless noted otherwise, all spectra are referenced to a scan of a sample-free region of the tungsten mesh. The mass spectrometer (MS) is housed in a differentially-pumped detector chamber coupled to the main chamber by two concentric pinhole apertures, which ensure that only desorbates from the sample surface are detected.

The experiments began with the creation of free-standing silica films by pressing approximately 10 mg of Aerosil A380 (Thermo-Fischer Scientific) into the void spaces of a 50 μm tungsten mesh grid (Tech-Etch) at 11,000 psi for 60 s. A K-type thermocouple was spot-welded adjacent to the sample to monitor temperature. The mesh was then mounted on the sample manipulator by nickel clamps. Samples were evacuated to approximately $4 \times 10^{-9}$ Torr and heated first to 450 K for 12 hours, then to 900 K for 15 minutes. The FTIR spectra of the samples before and after thermal treatment indicate that deleterious hydrocarbons and physisorbed water as well as geminal hydroxyl groups were removed from the surface, leaving only isolated silanol groups.

In a typical temperature-programmed desorption (TPD) experiment, the sample was exposed to $3 \times 10^{-7}$ Torr of $B_2H_6$ for a predetermined time period. Following dosing, the sample was aligned to the MS and heated at a rate of 0.36 K $s^{-1}$ until desorption was complete. MS signal is reported as the sum of counts per second for principal mass fragments for each species and has been adjusted to account for fragmentation inside the spectrometer.

Infrared spectra, recorded during exposure of clean silica to $B_2H_6$, reveal molecular adsorption through weak interactions. The intense infrared signal at 3750 $cm^{-1}$ is indicative of isolated surface Si—OH groups. Following initial characterization of the silica surface, the sample was exposed to 540 Langmuir of $B_2H_6$ at surface temperatures of 300, 400, and 500 K. In all cases, there were no observable changes to the spectrum following extensive $B_2H_6$ exposure, suggesting that the clean silica sample is largely unreactive toward diborane. Only upon sample cooling to 78 K and exposure to $B_2H_6$ did we observe new spectral bands. The new features (FIG. 2) are assigned to the fundamental vibrations of molecularly adsorbed $B_2H_6$.

The symmetric and asymmetric terminal B—H stretching motions of molecular $B_2H_6$ absorb infrared light at 2599 and 2508 $cm^{-1}$. The weak bands that appear near 1850 $cm^{-1}$ represent various B—H combination bands. The in-plane and out-of-plane deformation modes of the $B_2H_2$ ring moiety appear at 1585 and 1881 $cm^{-1}$. These deformation motions are exclusively observed for borane species containing cyclic $B_2H_2$ moieties, which are clear indication of non-dissociative $B_2H_6$ adsorption on silica. The shoulder at 2577 $cm^{-1}$ and the isolated features near 2150 $cm^{-1}$ are assigned to the B—H stretches of higher-order boranes, which are unavoidably present in the gas stream due to the aforementioned thermal self-degradation of $B_2H_6$ that occurs within the gas cylinder.

TABLE I

Vibrations of $B_2H_6$ at $SiO_2$.

| Surface Ads. Freq. ($cm^{-1}$) | Gas-Phase Freq. ($cm^{-1}$) | Calculated Gas-Phase Freq. ($cm^{-1}$) | Ar Matrix Freq. ($cm^{-1}$) | Mode (Fundamental) |
|---|---|---|---|---|
| 2624 | — | 2715 | 2624 | Combination band, B—H (2 v5 + v14) |
| 2599* | 2609 | 2756 | 2597 | Terminal B—H asymmetric stretch (v8) |
| 2523 | — | 2519** | 2522 | Combination band, B—H (v10 + v14 + v18) |
| 2508* | 2520 | 2652 | 2510 | Terminal B—H symmetric stretch (v16) |

TABLE I-continued

Vibrations of $B_2H_6$ at $SiO_2$.

| Surface Ads. Freq. ($cm^{-1}$) | Gas-Phase Freq. ($cm^{-1}$) | Calculated Gas-Phase Freq. ($cm^{-1}$) | Ar Matrix Freq. ($cm^{-1}$) | Mode (Fundamental) |
|---|---|---|---|---|
| 1850* | — | 1878** | 1850 | Combination band, B—H (ν9 + ν12) |
| 1834 | 1835 | 1894** | 1826 | Combination band, B—H (ν7 + ν14) |
| 1881 | 1879 | 2011 | 1880 | $B_2H_2$ ring, out-of-plane bend (ν13) |
| 1588* | 1603 | 1715 | 1584 | $B_2H_2$ ring, in-plane bend (ν17) |
| 966 | 972 | 999 | 967 | B—H in-phase wag (ν14) |

Matrix spectra recorded on $B_2H_6$ in argon polycrystalline films at 78 K.
*intense vibration.
**sum of calculated fundamentals.

During exposure, we find evidence for a weak hydrogen-bonding (H-bonding) interaction between $B_2H_6$ and Si—OH. The evidence appears as a decrease in the infrared absorbance associated with the free SiO—H band at 3750 $cm^{-1}$, and the appearance of a broad band assigned to H-bonded silanol groups at 3687 $cm^{-1}$. The direct relationship between these features is revealed by the fact that the depletion rate of the IR band assigned to the free —OH stretch matches the growth rate of the band assigned to the H-bonded OH stretch. Furthermore, these rates coincide with that of IR features assigned to adsorbed molecular $B_2H_6$ (FIG. 5, Appendix I) that develop during exposure. Importantly, desorption of molecular diborane occurred when the surface was returned to room temperature, which fully recovers the free SiO—H infrared absorbance feature to 100% of its initial intensity (i.e., the surface —OH groups remained free of chemisorbed products).

The H-bonding interaction observed in our infrared spectra takes the form of a bifurcated di-hydrogen bond involving both terminal B—H bonds of $B_2H_6$. To our knowledge this is the only direct experimental evidence for the existence of an interfacial or gas-phase di-hydrogen bond involving $B_2H_6$. To gain further insight into the strength of this unique gas-surface interaction, we employed variable-coverage TPD experiments. The clean silica surface was exposed to various amounts of $B_2H_6$ at a surface temperature of 78 K, then heated linearly while surface desorbates were monitored by a line-of-sight quadrupole mass spectrometer. During desorption, $B_2H_6$ was observed to desorb intact between 78 and 160 K, as indicated by the MS signal at 24 m/z and 26 m/z. The low peak desorption temperature of 100 K is consistent with a weak intermolecular interaction. The shape of the TPD profile remains invariant across a wide range of surface coverages (achieved by varying the dosing time at a constant dosing pressure of $3\times10^{-7}$ Torr $B_2H_6$, FIG. 3), suggesting that the driving force for adsorption is gas-surface interactions rather than condensation of $B_2H_6$ clusters. Notably, during the temperature ramp we see no evidence for the formation of new species on the surface, or for reactions of adsorbed $B_2H_6$. Overall, the experimental evidence shows that adsorption occurs through weak interactions between $B_2H_6$ and silica via di-hydrogen bonding, and that diborane does not react with silanol groups to modify the surface.

Figure 3:
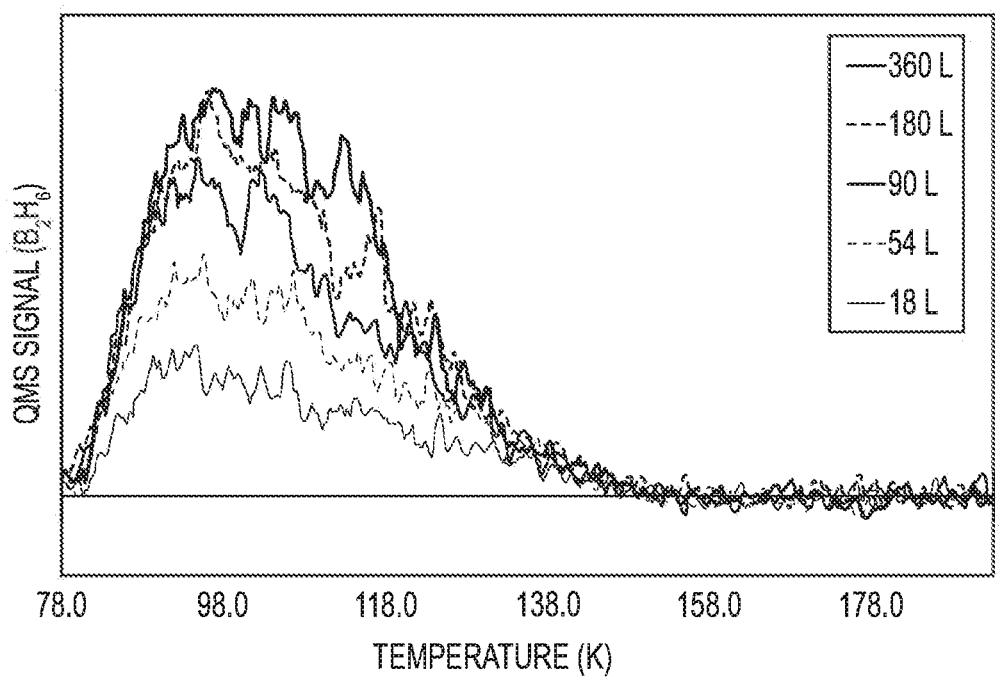
FIG. 3 shows data from a thermally programmed desorption step performed according to a method as described.
Figure 4:
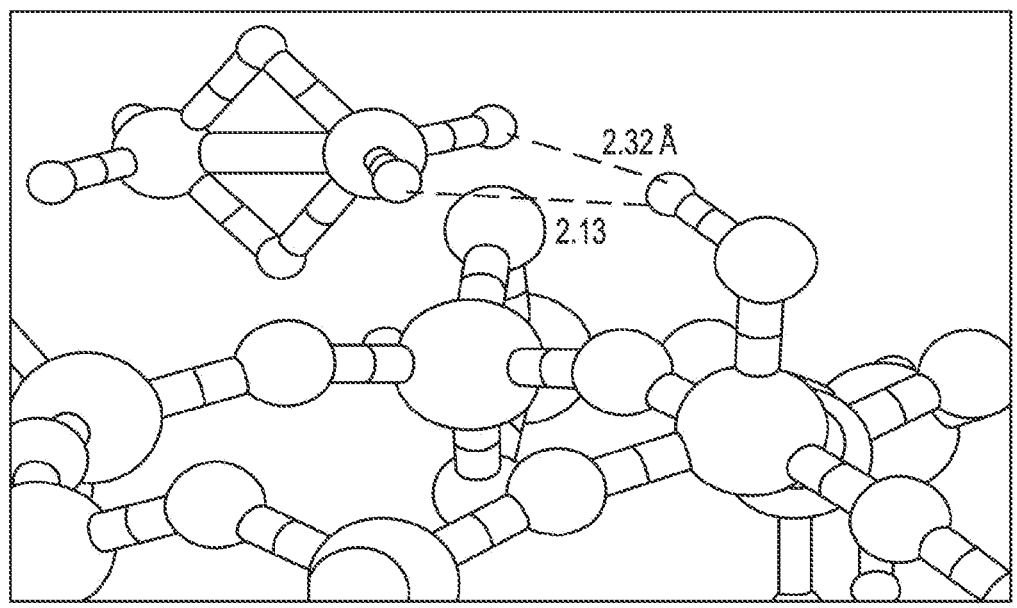
FIG. 4 shows a proposed mechanism of an adsorption step as described.

The existence of interfacial di-hydrogen bonding between $B_2H_6$ and silica was further probed through electronic-structure calculations. A cluster model of $Si_{15}O_{24}$ stoichiometry containing one isolated silanol group was obtained from the top layer of a β-cristobalite (111) surface. The diborane-silica adsorption geometry leading to a strongest gas-surface interaction (24.8 kJ/mol adsorption energy) exhibits a silanol SiO—H bond bisecting the H—B—H plane of a terminal $BH_2$ moiety (FIG. 3). This affords short contacts between the hydrogen atoms of the di-hydrogen donor and acceptor groups (2.32 and 2.13 Å), which are consistent with previously reported bond distances for di-hydrogen bonded borane-amine crystalline complexes, both calculated and experimental. Diborane is further anchored to the surface by weak interactions between a bridging H atom and 2 surface siloxanes ($H_b$—O distances of 2.54 and 2.85 Å). Also in line with the experiment and earlier calculations in the gas phase, the calculated di-hydrogen bond in FIG. 4 leads to a redshift (36 $cm^{-1}$) of the SiO—H stretch. We further probed this redshift with the calculations to provide fundamental insight into this unusual interfacial interaction. Natural-bond-orbital analysis of the diborane-silanol interaction reveals the redshift is caused by not only σ→σ* charge transfer from both σ B—H bonds to the O—H σ* orbital, but also by slightly weaker σ→σ* interactions in which electron density from the O—H bond is donated to 3-center 2-electron B—$H_b$—B antibonding orbitals. This work therefore shows that the electronic interactions in a dihydrogen bond involving diborane transcend immediate H—H contacts with terminal B—H bonds and also engage the bridging H atoms.

Figure 5:
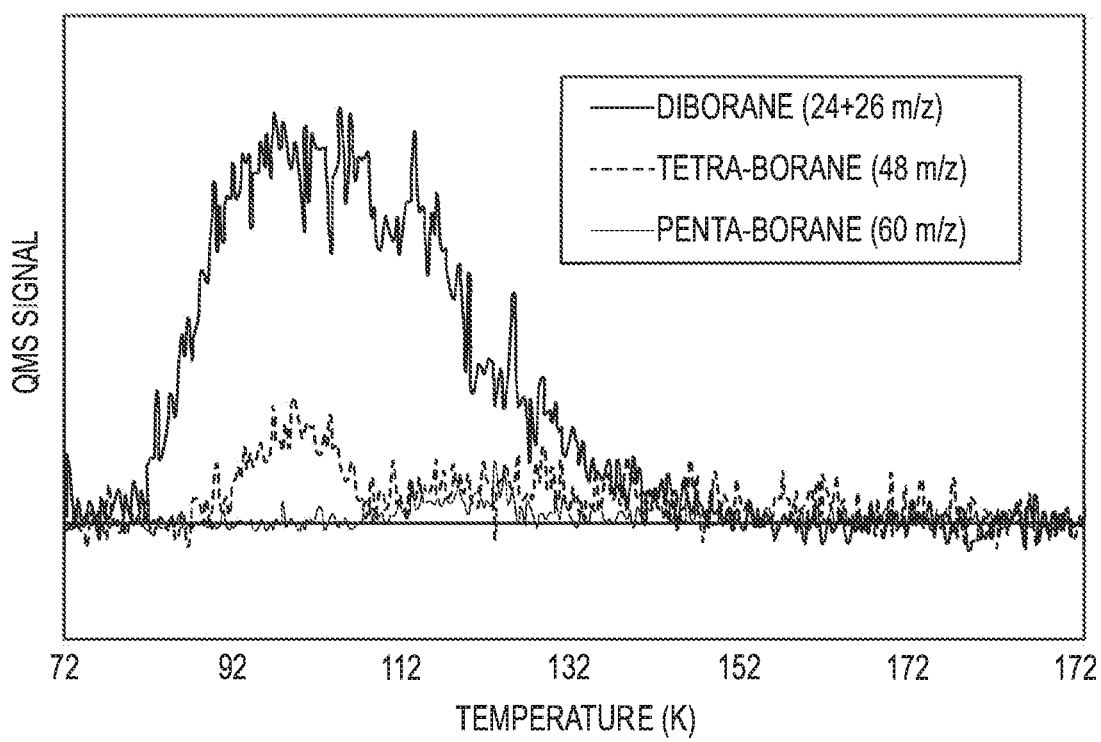
FIG. 5 shows thermally programmed desorption profiles for diborane, tetra-borane, and penta-borane, on silica.

FIG. 5 shows TPD profiles for diborane, tetra-borane, and penta-borane on Aerosil A380. Signal adjusted to compensate for fragmentation of higher-order boranes in the spectrometer. Temperature ramped linearly from 78 K to 98 K at 24 K $min^{-1}$. Exposure to $B_2H_6$ was for 20 mins at $3\times10^7$ Torr $B_2H_6$ and a surface temperature of 78 K. Signal is adjusted for fragmentation of higher-order boranes in the mass spectrometer.

Figure 6:
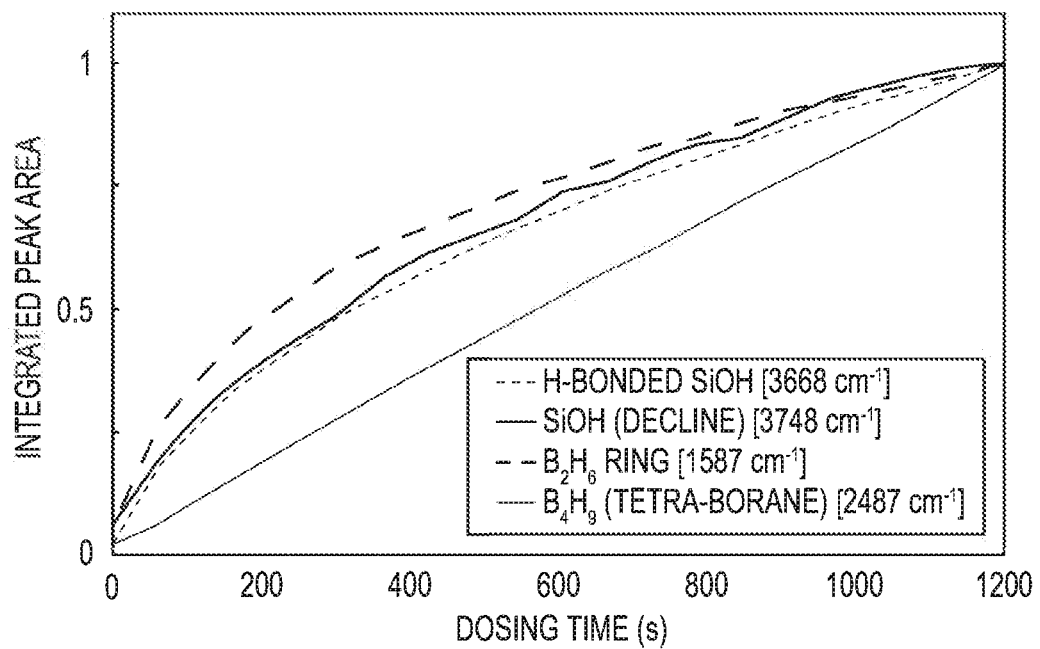
FIG. 6 shows data generated during adsorption of diborane and tetra-borane on silica.

FIG. 6 shows normalized integrated peak area for selected peaks during dosing. $B_2H_6$ (blue), $B_4H_9$ (red), and the decrease in SiO—H intensity (black). Peaks associated with tetra-borane grow linearly, while peaks associated with $B_2H_6$ display coverage-dependent behavior. The decline in the SiO—H feature and increase in the corresponding H-bonding feature are shown to be associated with the adsorption of $B_2H_6$ rather than higher-order boranes.

In summary, the adsorption of diborane ($B_2H_6$) on hydroxylated silica was investigated via in situ FTIR, variable-coverage TPD, and DFT calculations. We observe no experimental evidence for an irreversible reaction between $B_2H_6$ and silica at any temperature (78-500 K), which we attribute to the lack of water and other impurities in our vacuum system. We hypothesize that previous reports of reaction are due to the presence of adventitious water on the silica surface. The results also reveal a novel three-center hydrogen-bonding interaction between two terminal B—H bonds of $B_2H_6$ and the interfacial silanol groups of silica (SiO—H). The short inter-hydrogen distances and the observed redshift of the silanol O—H stretching frequency are consistent with a bifurcated di-hydrogen bond, which has not previously been observed experimentally for $B_2H_6$. The presence of di-hydrogen bonding between $B_2H_6$ and interfacial hydroxyl groups has important implications for the reactions of $B_2H_6$ with silica, which are still not well understood despite many decades of study. In addition, the observed lack of reaction between $B_2H_6$ and silanol groups suggests that the presence of physisorbed water may have a more involved role in the hydrolysis of boranes on hydroxylated surfaces than simply competing with surface groups. Future work by our research group will investigate the energetics and dynamics of $B_2H_6$ interfacial di-hydrogen bonding interactions as well as the role of molecular water in reactions between $B_2H_6$ and silica.

The invention claimed is:

1. A composition for gas storage, comprising hydroxylated silica, wherein the hydroxylated silica includes surface silicon atoms and isolated hydroxyl groups attached to the surface silicon atoms; and further including diborane atoms reversibly adsorbed to the isolated hydroxyl groups, wherein the diborane atoms are bonded to the surface silicon atoms by bifurcated di-hydrogen bond.

2. The composition of claim 1, wherein the diborane is adsorbed as non-dissociated $B_2H_6$ as indicated by infrared absorbance at 1585 $cm^{-1}$ and 1881 $cm^{-1}$.

3. The composition of claim 1, wherein the hydroxylated silica contains less than one percent of a monolayer of water.

4. The composition of claim 1, wherein diborane atoms are the only gas adsorbed at the surfaces of the hydroxylated silica.

5. The composition of claim 1, wherein over 70% of surface silicon atoms are covered by isolated hydroxyl groups.

6. The composition of claim 5, wherein the hydroxylated silica contains less than 20% of geminal hydroxyl groups.

\* \* \* \* \*